US012671598B2

(12) United States Patent
Li et al.

(10) Patent No.: US 12,671,598 B2
(45) Date of Patent: Jun. 30, 2026

(54) STRONG PUF CIRCUIT WITH GOOD STABILITY AND ANTI-ML ATTACK CAPACITY

(71) Applicant: Wenzhou University, Zhejiang (CN)

(72) Inventors: Gang Li, Zhejiang (CN); Pengjun Wang, Zhejiang (CN); Xilong Shao, Zhejiang (CN); Junjie Zhou, Zhejiang (CN); Bo Chen, Zhejiang (CN)

(73) Assignee: Wenzhou University, Zhejiang (CN)

( * ) Notice: Subject to any disclaimer, the term of this patent is extended or adjusted under 35 U.S.C. 154(b) by 71 days.

(21) Appl. No.: 18/981,643

(22) Filed: Dec. 16, 2024

(65) Prior Publication Data

US 2026/0089017 A1 Mar. 26, 2026

(30) Foreign Application Priority Data

Sep. 23, 2024 (CN) .......................... 202411320361.4

(51) Int. Cl.
| | |
|---|---|
| *H04L 9/32* | (2006.01) |
| *H03K 5/00* | (2006.01) |
| *H03K 5/01* | (2006.01) |
| *H03K 19/21* | (2006.01) |

(52) U.S. Cl.
CPC ............. *H04L 9/3278* (2013.01); *H03K 5/01* (2013.01); *H03K 2005/00013* (2013.01); *H03K 19/21* (2013.01)

(58) Field of Classification Search
None
See application file for complete search history.

(56) References Cited

U.S. PATENT DOCUMENTS

| | | | | |
|---|---|---|---|---|
| 2015/0195088 A1* | 7/2015 | Rostami | ................ | H04L 9/3278 |
| | | | | 380/28 |
| 2020/0044872 A1* | 2/2020 | Willsch | ................. | H04L 9/3278 |
| 2021/0336804 A1* | 10/2021 | Parhi | ..................... | H04L 9/0866 |
| 2022/0224333 A1* | 7/2022 | Wang | ....................... | H03K 5/01 |

(Continued)

OTHER PUBLICATIONS

Xuejiao Ma et al., "Machine learning attacks resistant strong PUF design utilizing response obfuscates challenge with lower hardware overhead", Microelectronics Journal, Oct. 16, 2023, pp. 1-11, vol. 142.

(Continued)

*Primary Examiner* — Jany Richardson
(74) *Attorney, Agent, or Firm* — JCIPRNET

(57) ABSTRACT

A strong PUF circuit with good stability and anti-ML attack capacity is provided. The strong PUF circuit includes n delay modules, n–1 interconnection modules, an arbiter array and an XOR gate, wherein n is an integer greater than or equal to 1, each delay module is implemented based on a bias source structure, and the number of transmission paths of input signals can be increased by means of the characteristics of the bias source structure of the delay module to realize a diversity of transmission, thus realizing a highly complex and unpredictable challenge-response mapping relation without multiple strong PUFs. The transmission characteristics (transmission paths) of the input signals can be further obfuscated by means of the interconnection modules. Only one XOR gate is used for generating response outputs to further improve the stability.

6 Claims, 7 Drawing Sheets

(56)        References Cited

U.S. PATENT DOCUMENTS

2024/0169100 A1*  5/2024  Li ............................ G06F 21/75
2025/0038747 A1*  1/2025  Li ............................ G06F 21/75
2025/0278522 A1*  9/2025  Kuenemund ........... G06F 21/73

OTHER PUBLICATIONS

Jieyun Zhang et al., "A 4T/Cell Amplifier-Chain-Based XOR PUF With Strong Machine Learning Attack Resilience", IEEE Transactions on Circuits and Systems-I: Regular Papers, Jan. 2022, pp. 366-377, vol. 69, No. 1.

Ziyu Zhou et al., "Bagua Protocol: A Whole-Process Configurable Protocol for IoT Sensing Devices Security Based on Strong PUF", IEEE Internet of Things Journal, Jan. 1, 2024, pp. 805-819, vol. 11, No. 1.

Yuki Tanaka et al., "Coin Flipping PUF: A Novel PUF With Improved Resistance Against Machine Learning Attacks", IEEE Transactions on Circuits and Systems-II: Express Briefs, May 2018, pp. 602-606, vol. 65, No. 5.

Zhengtai Chang et al., "Modeling attack resistant arbiter PUF with time-variant obfuscation scheme", 2021 31st International Conference on Field-Programmable Logic and Applications, 2021, pp. 60-63.

Jilinag Zhang et al., "Set-Based Obfuscation for Strong PUFs Against Machine Learning Attacks", IEEE Transactions on Circuits and Systems-I: Regular Papers, Jan. 1, 2021, pp. 288-300, vol. 68, No. 1.

Pranesh Santikellur et al., "A Computationally Efficient Tensor Regression Network-Based Modeling Attack on XOR Arbiter PUF and Its Variants", IEEE Transactions on Computer-Aided Design of Integrated Circuits and Systems, Jun. 2021, pp. 1197-1206, vol. 40, No. 6.

Rashid Ali et al., "A Reconfigurable Arbiter MPUF With High Resistance Against Machine Learning Attack", IEEE Transactions on Magnetics, Oct. 2021, pp. 1-7, vol. 57, No. 10.

Durga Prasad Sahoo et al., "A Multiplexer-Based Arbiter PUF Composition with Enhanced Reliability and Security", IEEE Transactions on Computers, Mar. 2018, pp. 403-417, vol. 67, No. 3.

Jianrong Yao et al., "Design and Evaluate Recomposited OR-and-XOR-PUF", IEEE Transactions on Emerging Topics in Computing, May 2, 2022, pp. 662-677, vol. 10, No. 2.

* cited by examiner

STRONG PUF CIRCUIT WITH GOOD STABILITY AND ANTI-ML ATTACK CAPACITY

CROSS-REFERENCE TO RELATED APPLICATION

This application claims the priority benefit of China application serial no. 202411320361.4, filed on Sep. 23, 2024. The entirety of the above-mentioned patent application is hereby incorporated by reference herein and made a part of this specification.

TECHNICAL FIELD

The invention relates to strong PUF circuits, in particular to a strong PUF circuit with good stability and anti-ML attack capacity.

DESCRIPTION OF RELATED ART

With the rapid development of the Internet of Things (IoT), information transmission between equipment is extremely crucial, and the protection of information against attacks very important. Traditional encryption methods depend on key storage and are severely threatened by various attack techniques such as invasive attacks and side-channel attacks (SCAs), making it difficult to apply these encryption methods to resource-constrained IoT equipment. Physical unclonable functions (PUFs) can generate random, unique and unclonable feature keys by extracting inevitable process deviations in the chip fabrication process, thus being applicable to the field of information security, for example, for equipment identification, key storage and IP protection. The PUFs include weak PUFs and strong PUFs according to their capacity to generate challenge-response pairs (CRPs). The weak PUFs are able to generate a small number of CRPs, which increases linearly with the area of an entropy source, thus being suitable for key generation. The strong PUFs are able to generate CRPs exponentially, thus being suitable for IoT equipment identification. However, responses generated in this way are easily attacked by machine learning (ML) modeling.

In view of the above problem, researchers generally improve the anti-ML attack capacity of the strong PUFs by increasing the complexity of the challenge-response mapping relation. For example, Ma et al., proposed in "MA Xuejiao, WANG Pengjun, LI Gang, et al., Machine learning attacks resistant strong PUF design utilizing response obfuscates challenge with lower hardware overhead [J]. *Microelectronics Journal*, 2023, 142.", the use of internal responses in a PUF for preliminary obfuscation of original challenges and byte substitution of the obfuscated challenges by an S-box to improve the anti-ML attack capacity. Zhang et al., proposed in "Zhang Jieyun, Xu Chongyao, Law Man-Kay, et al. A 4T/Cell Amplifier-Chain-Based XOR PUF With Strong Machine Learning Attack Resilience [J]. IEEE Transactions on Circuits and Systems I: Regular Papers, 2022, 69(1): 366-377.", an AC-XOR-PUF based on the bias voltage and amplification relation of amplifiers, where the number of ML modeling parameters is increased by means of process deviations and amplification information of two identical amplifier chains to resist ML modeling attacks. Zhou et al., proposed in "ZHOU Ziyu, WANG Pengjun, LI Gang. Bagua Protocol: A Whole-Process Configurable Protocol for IoT Sensing Devices Security Based on Strong PUF [J]. IEEE Internet of Things Journal, 2024, 11(1): 805-819.", a whole-process configurable protocol, which improves the anti-ML attack capacity of a strong PUF by configuring different matrix encryption methods for different devices. Tanaka et al. proposed in "TANAKA Yuki, BIAN Song, HIROMOTO Masayuki, et al. Coin flipping PUF: A novel PUF with improved resistance against machine learning attacks [J]. IEEE transactions on circuits and systems II: express briefs, 2018, 65(5): 602-606", a CF-PUF based on a strong non-linear relation between the convergence time and the threshold voltage change of a bistable ring. Chang et al., proposed in "CHANG Zhengtai, SHI Shanshan, SONG Binwei, et al. Modeling attack resistant arbiter PUF with time-variant obfuscation scheme[C]. proceedings of the 2021 31st International Conference on Field-Programmable Logic and Applications (FPL), 2021: 60-63.", the addition of a linear feedback shift register before challenges to obfuscate the relation between challenges and responses. Zhang et al., proposed in "ZHANG Jiliang, SHEN Chaoqun. Set-based obfuscation for strong PUFs against machine learning attacks [J]. IEEE transactions on circuits and systems I: regular papers, 2020, 68(1): 288-300", a random set-based obfuscation technique for strong PUFs, which uses two random numbers to perform an XOR operation on challenges and responses respectively to resist ML attacks.

For simple and practical APUFs (arbiter physical unclonable functions), researchers developed variant PUFs based on different combinatorial logics by means of logic operations between responses of multiple APUFs, for example, the XOR-PUF proposed in "SANTIKELLUR Pranesh, CHAKRABORTY Rajat Subhra. A Computationally Efficient Tensor Regression Network-Based Modeling Attack on XOR Arbiter PUF and Its Variants [J]. IEEE Transactions on Computer-Aided Design of Integrated Circuits and Systems, 2021, 40(6): 1197-1206.", MPUFs proposed in "ALI Rashid, MA Haoyuan, HOU Zhengyi, et al., A Reconfigurable Arbiter MPUF With High Resistance Against Machine Learning Attack [J]. IEEE Transactions on Magnetics, 2021, 57(10): 1-7." and in Literature "SAHOO Durga Prasad, MUKHOPADHYAY Debdeep, CHAKRABORTY Rajat Subhra, et al., A Multiplexer-Based Arbiter PUF Composition with Enhanced Reliability and Security [J]. IEEE Transactions on Computers, 2018, 67(3): 403-417.", and the OAX-PUF proposed in "YAO Jianrong, PANG Lihui, SU Yang, et al., Design and Evaluate Recomposited OR-AND-XOR-PUF [J]. IEEE Transactions on Emerging Topics in Computing, 2022: 1-1.".

All these strong PUFs resist ML modeling attacks by increasing the complexity of the challenge-response mapping relation. Although the anti-ML attack capacity of these strong PUFs is high, they are variant PUFs based on different combinatorial logics developed by means of logic operations between responses of multiple APUFs, and multiple strong PUFs are used, leading to higher hardware overhead; in addition, because the output of each strong PUF may be affected by temperature fluctuations, voltage fluctuations and other factors, when outputs of these strong PUFs interact with each other during the obfuscation process, output fluctuations of any one strong PUF may lead to the instability of final outputs, thus reducing the stability of the whole strong PUF.

SUMMARY

The technical issue to be settled by the invention is to provide a strong PUF circuit with good stability and anti-ML attack capacity, which is high in anti-ML attack capacity, small in hardware overhead and high in stability.

The technical solution adopted by the invention to settle the above technical problem is as follows: a strong PUF circuit with good stability and anti-ML attack capacity comprises n delay modules, n−1 interconnection modules, an arbiter array and an XOR gate, wherein n is an integer greater than or equal to 1, each delay module is implemented based on a bias source structure and has 2×d input terminals, l selection terminals and d output terminals, d=$2^i$, i is an integer greater than or equal to 2, l is an integer greater than or equal to 1, each interconnection module has d input terminals and 2×d output terminals, the arbiter array has d input terminals and d/2 output terminals, and the XOR gate has d/2 input terminals and an output terminal; when n=1, the d output terminals of the $n^{th}$ delay module are connected to the d input terminals of the arbiter array in one-to-one correspondence; when n=2, the d output terminals of the first delay module are connected to the d input terminals of the first interconnection module in one-to-one correspondence, the 2×d output terminals of the first interconnection module are connected to the 2×d input terminals of the second delay module in one-to-one correspondence, and the d output terminals of the $n^{th}$ delay module are connected to the d input terminals of the arbiter array in one-to-one correspondence; when n is greater than or equal to 3, the d output terminals of the $p^{th}$ delay module are connected to the d input terminals of the $p^{th}$ interconnection module in one-to-one correspondence, the 2×d output terminals of the $p^{th}$ interconnection module are connected to the 2×d input terminals of the $(p+1)^{th}$ delay module in one-to-one correspondence, p=1, 2, . . . , n−1, and the d output terminals of the $n^{th}$ delay module are connected to the d input terminals of the arbiter array in one-to-one correspondence; the d/2 output terminals of the arbiter array are connected to the d/2 input terminals of the XOR gate in one-to-one correspondence; the l selection terminals of the n delay modules form n×l challenge terminals of the strong PUF circuit with an anti-ML attack capacity and allow n×l challenge signals to be input thereto, the output terminal of the XOR gate is an output terminal of the strong PUF circuit with an anti-ML attack capacity and used for outputting PUF responses, and the 2×d input terminals of the first delay module are 2×d trigger terminals of the strong PUF circuit with an anti-ML attack capacity and allow 2×d input signals to be input thereto as trigger signals; l challenge signals are input to the l selection terminals of each delay module, 2×d input signals are input to the 2×d input terminals of each delay module, and each delay module from the first delay module to the (n−1)th delay module combines every two of the 2×d input signals input to the 2×d input terminals thereof under the control of the l challenge signals input to the l selection terminals thereof to form d groups of input signals to be screened, wherein the input signal with a large delay is screened out of each of the d/2 groups, the input signal with a small delay is screened out of each of the other d/2 groups, d output signals are generated according to the d/2 input signals with a large delay and the d/2 input signals with a small delay and used as d input signals of the interconnection module connected to the delay module; the $n^{th}$ delay module combines every two of the 2×d input signals input to the 2×d input terminals thereof under the control of the l challenge signals input to the l selection terminals thereof to form d groups of input signals, wherein the input signal with a large delay is screened out of each of the d/2 groups, the input signal with a small delay is screened out of each of the other d/2 groups, and d output signals are generated according to the d/2 input signals with a large delay and the d/2 input signals with a small delay, used as d input signals of the arbiter array and input to the d input terminals of the arbiter array in one-to-one correspondence by means of the d output terminals of the $n^{th}$ delay module; the arbiter array combines every two of the d input signals input to the d input terminals thereof to form d/2 groups of input signals for arbitration to obtain d/2 arbitration signals, which are used as d/2 input signals of the XOR gate and input to the d/2 input terminals of the XOR gate in one-to-one correspondence by means of the d/2 output terminals of the arbiter array; the XOR gate performs an XOR operation on the d/2 input signals input to the d/2 input terminals thereof to obtain a PUF response, which is output by means of the output terminal of the XOR gate; and each interconnection module is used for duplicating the d input signals input to the d input terminals thereof to generate 2×d output signals, which are used as 2×d input signals of the delay module connected to the interconnection module and output to the 2×d input terminals of the delay module connected to the interconnection module in one-to-one correspondence by means of the 2×d output terminals of the interconnection module.

Each delay module comprises l stages of upper bias sources, l stages of lower bias sources, d/2 AND gates and d/2 OR gates, wherein each stage of upper bias source and each stage of lower bias source respectively have d input terminals, d output terminals and a selection terminal, each AND gate has two input terminals and an output terminal, and each OR gate has two input terminals and an output terminal; a challenge signal is input to the selection terminal of each stage of upper bias source, d input signals are input to the d input terminals of each stage of upper bias source, and each stage of upper bias source transforms transmission paths of the d input signals input to the d input terminals thereof under the control of the challenge signal input to the selection terminal thereof to generate d output signals, which are output by means of the d output terminals of said stage of upper bias source in one-to-one correspondence; a challenge signal is input to the selection terminal of each stage of lower bias source, d input signals are input to the d input terminals of each stage of lower bias source, and each stage of lower bias source transforms transmission paths of the d input signals input to the d input terminals thereof under the control of the challenge signal input to the selection terminal thereof to generate d output signals, which are output by means of the d output terminals of said stage of lower bias source in one-to-one correspondence; the d input terminals of the first stage of upper bias source and the d input terminals of the first stage of lower bias source, 2×d input terminals in total, are used as the 2×d input terminals of the delay module; the output terminals of the d/2 AND gates and the output terminals of the d/2 OR gates, d output terminals in total, are used as the d output terminals of the delay module; the selection terminal of the $l^{th}$ stage of upper bias source is connected to the selection terminal of the $l^{th}$ stage of lower bias source and a connecting terminal is the $l^{th}$ selection terminal of the delay module, and the first to the $l^{th}$ selection terminals of the delay module, l selection terminals in total, form the l selection terminals of the delay module; when l=1, the d output terminals of the first stage of upper bias source are connected to the first input terminals of the d/2 AND gate and the first input terminals the d/2 OR gates, d input terminals in total, in one-to-one correspondence, the d output terminals of the first stage of lower bias source are connected to the second input terminals of the d/2 AND gate and the second input terminals of the d/2 OR gates, d input terminals in total, in one-to-one correspondence, d output signals generated by the first stage of upper bias source and d output signals generated by the first stage of lower bias source are combined in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on the two input signals input to the two input terminals thereof to obtain an operation result, which is output by means of the output terminal of the OR gate as an output signal; when l=2, the d output terminals of the first stage of upper bias source are connected to the d input terminals of the second stage of upper bias source in one-to-one correspondence, the d output terminals of the second stage upper bias source are connected to the first input terminals of the d/2 AND gates and the first input terminals of the d/2 OR gates, d input terminals in total, in one-to-one correspondence, the d output terminals of the first stage of lower bias source are connected to the d input terminals of the second stage of lower bias source in one-to-one correspondence, the d output terminals of the second stage of lower bias source are connected to the first input terminals of the d/2 AND gates and the first input terminals of the d/2 OR gates, d input terminals in total, in one-to-one correspondence, d output signals generated by the first stage of upper bias source are used as d input signals input to the d input terminals of the second stage of upper bias source, d output signals generated by the first stage of lower bias source are used as d input signals input to the d input terminals of the second stage of lower bias source, d output signals generated by the second stage of upper bias source are combined with d output signals generated by the second stage of lower bias sources in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on two input signals input to the two input terminals thereof to obtain an operation result, which is output by means of the output terminal of the OR gate as an output signal; when l≥3, the d output terminals of the $q^{th}$ stage of upper bias source are connected to the d input terminals of the $(q+1)^{th}$ stage of upper bias source in one-to-one correspondence, q=1, 2, . . . , l−1, the d output terminals of the $l^{th}$ stage of upper bias source are connected to the first input terminals of the d/2 AND gates and the first input terminals of the d/2 OR gate, d input terminals in total, in one-to-one correspondence, the d output terminals of an $s^{th}$ stage of lower bias source are connected to the d input terminals of the $(s+1)^{th}$ stage of lower bias source in one-to-one correspondence, s=1, 2, . . . , l−1, and the d output terminals of the $l^{th}$ stage of lower bias source are connected to the second input terminals of the d/2 AND gates and the second input terminals of the d/2 OR gate, d input terminals, in one-to-one correspondence; wherein, d output signals generated by the $q^{th}$ stage of upper bias source are used as d input signals input to the d input terminals of the $(q+1)^{th}$ stage of upper bias source; d output signals generated by the $q^{th}$ stage of lower bias source are used as d input signals input to the d input terminals of the $(q+1)^{th}$ stage of lower bias source; d output signals generated by the $l^{th}$ stage of upper bias source are combined with d output signals generated by the $l^{th}$ stage of lower bias source in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on two input signals input to the two input terminals thereof to obtain an operation result, which is output by means of the output terminal of the OR gate as an output signal.

Each upper bias source comprises d multiplexers; each multiplexer has two data input terminals, a selection terminal and an output terminal, wherein the two data input terminals are referred to as a first input terminal and a second input terminals respectively; when 0 is input to the selection terminal, the first input terminal is connected to the output terminal; when 1 is input to the selection terminal, the second input terminal is connected to the output terminal; the selection terminals of the d multiplexers are connected and a connecting terminal is the selection terminal of the upper bias source; the output terminals of the d multiplexers are used as the d output terminals of the upper bias source; when d=4, the first input terminal of the first multiplexer is connected to the second input terminal of the second multiplexer and a connecting terminal is the first input terminal of the upper bias source, the second input terminal of the first multiplexer is connected to the first input terminal of the third multiplexer and a connecting terminal is the second input terminal of the upper bias source, the first input terminal of the second multiplexer is connected to the second input terminal of the fourth multiplexer and a connecting terminal is the third input terminal of the upper bias source, and the second input terminal of the third multiplexer is connected to the first input terminal of the fourth multiplexer and a connecting terminal is the fourth input terminal of the upper bias source; when d is greater than 4, the first input terminal of the first multiplexer is connected to the second input terminals of the second multiplexer and a connecting terminal is the first input terminal of the upper bias source; the first input terminal of the $m^{th}$ multiplexer is connected to the second input terminal of the $(m−2)^{th}$ multiplexer and a connecting terminal is the $(m−1)^{th}$ input terminal of the upper bias source, wherein m is an odd number, and m=3, 5, 7, . . . , d−1; the first input terminal of the $w^{th}$ multiplexer is connected to the second input terminal of the $(w+2)^{th}$ multiplexer and a connecting terminal is the $(w+1)^{th}$ input terminal of the upper bias source, wherein w is an even number, and w=2, 4, 6, . . . , d−2; the first input terminal of the $d^{th}$ multiplexer is connected to the second input terminal of the $(d−1)^{th}$ multiplexer and a connecting terminal is the $d^{th}$ input terminal of the upper bias source; and the structure of each lower bias source is the completely identical with the structure of each upper bias source.

When d=4, the first input terminal of the interconnection module is connected to the second output terminal and the sixth output terminal of the interconnection module, the second input terminal of the interconnection module is connected to the first output terminal and the fifth output terminal of the interconnection module, the third input terminal of the interconnection module is connected to the third output terminal and the seventh output terminal of the interconnection module, and the output input terminal of the interconnection module is connected to the fourth output terminal and the eighth output terminal of the interconnection module; when d is greater than 4, the first input terminal of the interconnection module is connected to the second output terminal and the $(d+2)^{th}$ output terminal of the interconnection module, the second input terminal of the interconnection module is connected to the first output terminal and the $(d+1)^{th}$ output terminal of the interconnection module, the $h^{th}$ input terminal of the interconnection module is connected to the $h^{th}$ output terminal and the $(d+h)^{th}$ output terminal of the interconnection module, wherein, d=3, 4, ..., d−2, the $(d−1)^{th}$ input terminal of the interconnection module is connected to the $d^{th}$ output terminal and the $(2×d)^{th}$ output terminal of the interconnection module, and the $d^{th}$ input terminal of the interconnection module is connected to the $(d−1)^{th}$ output terminal and the $(2×d−1)^{th}$ output terminal of the interconnection module.

The arbiter array comprises d/2 arbiter units, each arbiter unit has two input terminals and an output terminal, an input signal is input to each input terminal of each arbiter unit, and each arbiter unit arbitrates the two input signals input to the two input terminals thereof to obtain an arbitration result, which is output by means of the output terminal of the arbiter unit as an output signal; and the two input terminals of the d/2 arbiter units, d input terminals in total, are the d input terminals of the arbiter array, and the output terminals of the d/2 arbiter units, d/2 output terminals in total, are the d/2 output terminals of the arbiter array.

Each arbiter unit comprises two input NAND gates, wherein each input NAND gate has a first input terminal, a second input terminal and an output terminal, the two input NAND gates are referred to a first input NAND gate and a second input NAND gate respectively, the first input terminal of the first input NAND gate and the second input terminal of the second input NAND gate are the two input terminals of the arbiter unit, the second input terminal of the first input NAND gate is connected to the output terminal of the second input NAND gate and a connecting terminal is the output terminal of the arbiter unit, and the output terminal of the first input NAND gate is connected to the first input terminal of the second input NAND gate.

Compared with the prior art, the invention has the following advantages: the strong PUF circuit capable of resisting ML attacks is constructed by n delay modules, n−1 interconnection modules, an arbiter array and an AND gate, each delay module is implemented based on a bias source structure, and the number of transmission paths of input signals can be increased by means of the characteristics of the bias source structure of the delay module, thus realizing a diversity of transmission; moreover, the transmission characteristics (transmission paths) of the input signals can be further obfuscated by means of the interconnection modules, such that a highly complex and unpredictable challenge-response mapping relation can be realized without multiple strong PUFs, thus improving the anti-ML attack capacity and avoiding instability caused by the use of multiple strong PUFs; in addition, only one XOR gate is used for generating response outputs to further improve the stability, such that the anti-ML attack capacity is high, the hardware overhead is small, and the stability is good.

DESCRIPTION OF THE EMBODIMENTS

The invention is described in further detail below in conjunction with accompanying drawings and embodiments.

Figure 1:
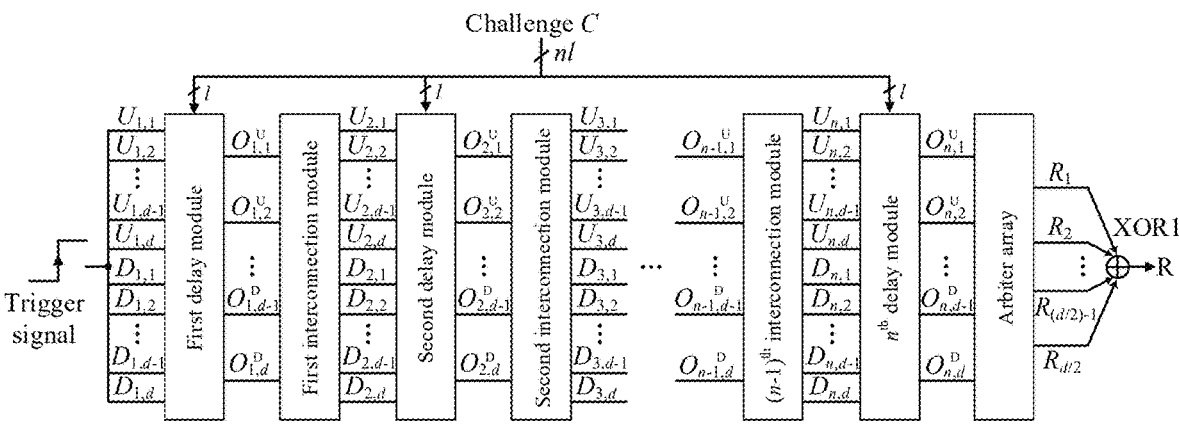
FIG. 1 is a structural diagram of a strong PUF circuit with good stability and anti-ML attack capacity according to the invention.

Embodiment 1: As shown in FIG. 1, a strong PUF circuit with good stability and anti-ML attack capacity comprises n delay modules, n−1 interconnection modules, an arbiter array and an XOR gate XOR1, wherein n is an integer greater than or equal to 1, each delay module is implemented based on a bias source structure and has 2×d input terminals, l selection terminals and d output terminals, $d=2^i$, i is an integer greater than or equal to 2, l is an integer greater than or equal to 1, each interconnection module has d input terminals and 2×d output terminals, the arbiter array has d input terminals and d/2 output terminals, and the XOR gate XOR1 has d/2 input terminals and an output terminal; when n=1, the d output terminals of the $n^{th}$ delay module are connected to the d input terminals of the arbiter array in one-to-one correspondence; when n=2, the d output terminals of the first delay module are connected to the d input terminals of the first interconnection module in one-to-one correspondence, the 2×d output terminals of the first interconnection module are connected to the 2×d input terminals of the second delay module in one-to-one correspondence, and the d output terminals of the $n^{th}$ delay module are connected to the d input terminals of the arbiter array in one-to-one correspondence; when n is greater than or equal to 3, the d output terminals of the $p^{th}$ delay module are connected to the d input terminals of the $p^{th}$ interconnection module in one-to-one correspondence, the 2×d output terminals of the $p^{th}$ interconnection module are connected to the 2×d input terminals of the $(p+1)^{th}$ delay module in one-to-one correspondence, p=1, 2, . . . , n−1, and the d output terminals of the $n^{th}$ delay module are connected to the d input terminals of the arbiter array in one-to-one correspondence; the d/2 output terminals of the arbiter array are connected to the d/2 input terminals of the XOR gate XOR1 in one-to-one correspondence; the l selection terminals of the n delay modules form n×l challenge terminals of the strong PUF circuit with good stability and anti-ML attack capacity and allow n×l challenge signals to be input thereto, the output terminal of the XOR gate XOR1 is an output terminal of the strong PUF circuit with good stability and anti-ML attack capacity and used for outputting PUF responses, and the 2×d input terminals of the first delay module are 2×d trigger terminals of the strong PUF circuit with good stability and anti-ML attack capacity and allow 2×d input signals to be input thereto as trigger signals; l challenge signals are input to the l selection terminals of each delay module, 2×d input signals are input to the 2×d input terminals of each delay module, and each delay module from the first delay module to the $(n−1)^{th}$ delay module combines every two of the 2×d input signals input to the 2×d input terminals thereof under the control of the l challenge signals input to the l selection terminals thereof to form d groups of input signals to be screened, wherein the input signal with a large delay is screened out of each of the d/2 groups, the input signal with a small delay is screened out of each of the other d/2 groups, d output signals are generated according to the d/2 input signals with a large delay and the d/2 input signals with a small delay and used as d input signals of the interconnection module connected to the delay module; the $n^{th}$ delay module combines every two of the 2×d input signals input to the 2×d input terminals thereof under the control of the l challenge signals input to the l selection terminals thereof to form d groups of input signals, wherein the input signal with a large delay is screened out of each of the d/2 groups, the input signal with a small delay is screened out of each of the other d/2 groups, and d output signals are generated according to the d/2 input signals with a large delay and the d/2 input signals with a small delay, used as d input signals of the arbiter array and input to the d input terminals of the arbiter array in one-to-one correspondence by means of the d output terminals of the $n^{th}$ delay module; the arbiter array combines every two of the d input signals input to the d input terminals thereof to form d/2 groups of input signals for arbitration to obtain d/2 arbitration signals, which are used as d/2 input signals of the XOR gate XOR1 and input to the d/2 input terminals of the XOR gate XOR1 in one-to-one correspondence by means of the d/2 output terminals of the arbiter array; the XOR gate XOR1 performs an XOR operation on the d/2 input signals input to the d/2 input terminals thereof to obtain a PUF response, which is output by means of the output terminal of the XOR gate XOR1; and each interconnection module is used for duplicating the d input signals input to the d input terminals thereof to generate 2×d output signals, which are used as 2×d input signals of the delay module connected to the interconnection module and output to the 2×d input terminals of the delay module connected to the interconnection module in one-to-one correspondence by means of the 2×d output terminals of the interconnection module.

In this embodiment, each delay module is implemented based on a bias source structure, and the number of transmission paths of input signals can be increased by means of the characteristics of the bias source structure of the delay module, thus realizing a diversity of transmission; moreover, the transmission characteristics (transmission paths) of the input signals can be further obfuscated by means of the interconnection modules, such that a highly complex and unpredictable challenge-response mapping relation can be realized without multiple strong PUFs, thus improving the anti-ML attack capacity and avoiding instability caused by the use of multiple strong PUFs; in addition, only one XOR gate is used for generating response outputs to further improve the stability, such that the anti-ML attack capacity is high, the hardware overhead is small, and the stability is good.

Figure 2:
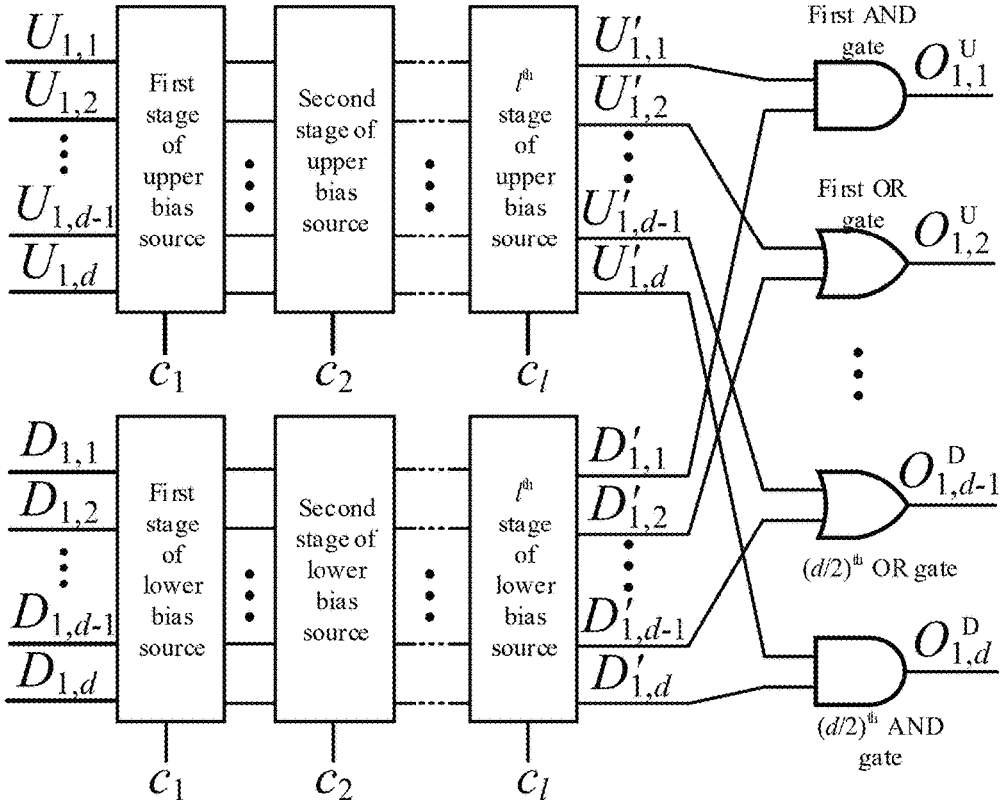
FIG. 2 is a structural diagram of a delay module of the strong PUF circuit with good stability and anti-ML attack capacity according to the invention.

Embodiment 2: This embodiment is basically the same as Embodiment 1 but is different from Embodiment 1 in the following aspect: as shown in FIG. 2, in this embodiment, each delay module comprises l stages of upper bias sources, l stages of lower bias sources, d/2 AND gates and d/2 OR gates, wherein each stage of upper bias source and each stage of lower bias source respectively have d input terminals, d output terminals and a selection terminal, each AND gate has two input terminals and an output terminal, and each OR gate has two input terminals and an output terminal; a challenge signal is input to the selection terminal of each stage of upper bias source, d input signals are input to the d input terminals of each stage of upper bias source, and each stage of upper bias source transforms transmission paths of the d input signals input to the d input terminals thereof under the control of the challenge signal input to the selection terminal thereof to generate d output signals, which are output by means of the d output terminals of said stage of upper bias source in one-to-one correspondence; a challenge signal is input to the selection terminal of each stage of lower bias source, d input signals are input to the d input terminals of each stage of lower bias source, and each stage of lower bias source transforms transmission paths of the d input signals input to the d input terminals thereof under the control of the challenge signal input to the selection terminal thereof to generate d output signals, which are output by means of the d output terminals of said stage of lower bias source in one-to-one correspondence; the d input terminals of the first stage of upper bias source and the d input terminals of the first stage of lower bias source, 2×d input terminals in total, are used as the 2×d input terminals of the delay module; the output terminals of the d/2 AND gates and the output terminals of the d/2 OR gates, d output terminals in total, are used as the d output terminals of the delay module; the selection terminal of the $1^{th}$ stage of upper bias source is connected to the selection terminal of the $1^{th}$ stage of lower bias source and a connecting terminal is the $1^{th}$ selection terminal of the delay module, and the first to the $1^{th}$ selection terminals of the delay module, l selection terminals in total, form the l selection terminals of the delay module; when l=1, the d output terminals of the first stage of upper bias source are connected to the first input terminals of the d/2 AND gate and the first input terminals the d/2 OR gates, d input terminals in total, in one-to-one correspondence, the d output terminals of the first stage of lower bias source are connected to the second input terminals of the d/2 AND gate and the second input terminals of the d/2 OR gates, d input terminals in total, in one-to-one correspondence, d output signals generated by the first stage of upper bias source and d output signals generated by the first stage of lower bias source are combined in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on the two input signals input to the two input terminals thereof to obtain an operation result, which is output by means of the output terminal of the OR gate as an output signal; when l=2, the d output terminals of the first stage of upper bias source are connected to the d input terminals of the second stage of upper bias source in one-to-one correspondence, the d output terminals of the second stage upper bias source are connected to the first input terminals of the d/2 AND gates and the first input terminals of the d/2 OR gates, d input terminals in total, in one-to-one correspondence, the d output terminals of the first stage of lower bias source are connected to the d input terminals of the second stage of lower bias source in one-to-one correspondence, the d output terminals of the second stage of lower bias source are connected to the first input terminals of the d/2 AND gates and the first input terminals of the d/2 OR gates, d input terminals in total, in one-to-one correspondence, d output signals generated by the first stage of upper bias source are used as d input signals input to the d input terminals of the second stage of upper bias source, d output signals generated by the first stage of lower bias source are used as d input signals input to the d input terminals of the second stage of lower bias source, d output signals generated by the second stage of upper bias source are combined with d output signals generated by the second stage of lower bias sources in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on two input signals input to the two input terminals thereof to obtain an operation result, which is output by means of the output terminal of the OR gate as an output signal; when l≥3, the d output terminals of the $q^{th}$ stage of upper bias source are connected to the d input terminals of the $(q+1)^{th}$ stage of upper bias source in one-to-one correspondence, q=1, 2, . . . , l−1, the d output terminals of the $l^{th}$ stage of upper bias source are connected to the first input terminals of the d/2 AND gates and the first input terminals of the d/2 OR gate, d input terminals in total, in one-to-one correspondence, the d output terminals of an $s^{th}$ stage of lower bias source are connected to the d input terminals of the $(s+1)^{th}$ stage of lower bias source in one-to-one correspondence, s=1, 2, . . . , l−1, and the d output terminals of the $l^{th}$ stage of lower bias source are connected to the second input terminals of the d/2 AND gates and the second input terminals of the d/2 OR gate, d input terminals, in one-to-one correspondence; wherein, d output signals generated by the $q^{th}$ stage of upper bias source are used as d input signals input to the d input terminals of the $(q+1)^{th}$ stage of upper bias source; d output signals generated by the $q^{th}$ stage of lower bias source are used as d input signals input to the d input terminals of the $(q+1)^{th}$ stage of lower bias source; d output signals generated by the $l^{th}$ stage of upper bias source are combined with d output signals generated by the $l^{th}$ stage of lower bias source in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on two input signals input to the two input terminals thereof to obtain an operation result, which is output by means of the output terminal of the OR gate as an output signal.

Figures 3, 4:
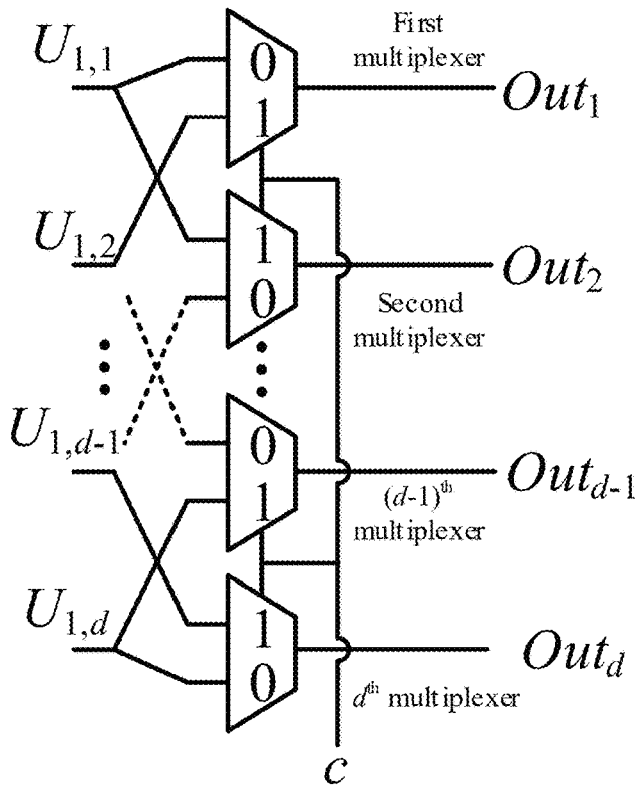
FIG. 3 is a structural diagram of an upper bias source of the strong PUF circuit with good stability and anti-ML attack capacity according to the invention.
FIG. 4 is a structural diagram of an interconnection module of the strong PUF circuit with good stability and anti-ML attack capacity according to the invention.

As shown in FIG. 3, in this embodiment, each upper bias source comprises d multiplexers; each multiplexer has two data input terminals, a selection terminal and an output terminal, wherein the two data input terminals are referred to as a first input terminal and a second input terminals respectively; when 0 is input to the selection terminal, the first input terminal is connected to the output terminal; when 1 is input to the selection terminal, the second input terminal is connected to the output terminal; the selection terminals of the d multiplexers are connected and a connecting terminal is the selection terminal of the upper bias source; the output terminals of the d multiplexers are used as the d output terminals of the upper bias source; when d=4, the first input terminal of the first multiplexer is connected to the second input terminal of the second multiplexer and a connecting terminal is the first input terminal of the upper bias source, the second input terminal of the first multiplexer is connected to the first input terminal of the third multiplexer and a connecting terminal is the second input terminal of the upper bias source, the first input terminal of the second multiplexer is connected to the second input terminal of the fourth multiplexer and a connecting terminal is the third input terminal of the upper bias source, and the second input terminal of the third multiplexer is connected to the first input terminal of the fourth multiplexer and a connecting terminal is the fourth input terminal of the upper bias source; when d is greater than 4, the first input terminal of the first multiplexer is connected to the second input terminals of the second multiplexer and a connecting terminal is the first input terminal of the upper bias source; the first input terminal of the $m^{th}$ multiplexer is connected to the second input terminal of the $(m−2)^{th}$ multiplexer and a connecting terminal is the $(m−1)^{th}$ input terminal of the upper bias source, wherein m is an odd number, and m=3, 5, 7, . . . , d−1; the first input terminal of the $w^{th}$ multiplexer is connected to the second input terminal of the $(w+2)^{th}$ multiplexer and a connecting terminal is the $(w+1)^{th}$ input terminal of the upper bias source, wherein w is an even number, and w=2, 4, 6, . . . , d−2; the first input terminal of the $d^{th}$ multiplexer is connected to the second input terminal of the $(d−1)^{th}$ multiplexer and a connecting terminal is the $d^{th}$ input terminal of the upper bias source; and the structure of each lower bias source is the completely identical with the structure of each upper bias source.

In this embodiment, the delay module is formed by the l stages of upper bias sources, the l stages of lower bias source, the d/2 AND gates and the d/2 OR gates, and the upper bias sources and the lower bias sources are implemented by bias source structures, which are formed by multiplexers and connected symmetrically, such that the transmission diversity of input signals can be improved; and transmission paths of the input signals are further obfuscated by means of the d/2 AND gates and the d/2 OR gates, such that the unpredictability of signal transmission is improved, thus improving the anti-ML attack capacity.

Embodiment 3: This embodiment is basically the same as Embodiment 1 but is different from Embodiment 1 in the following aspect: as shown in FIG. 4, in this embodiment, when d=4, the first input terminal of the interconnection module is connected to the second output terminal and the sixth output terminal of the interconnection module, the second input terminal of the interconnection module is connected to the first output terminal and the fifth output terminal of the interconnection module, the third input terminal of the interconnection module is connected to the third output terminal and the seventh output terminal of the interconnection module, and the output input terminal of the interconnection module is connected to the fourth output terminal and the eighth output terminal of the interconnection module; when d is greater than 4, the first input terminal of the interconnection module is connected to the second output terminal and the $(d+2)^{th}$ output terminal of the interconnection module, the second input terminal of the interconnection module is connected to the first output terminal and the $(d+1)^{th}$ output terminal of the interconnection module, the $h^{th}$ input terminal of the interconnection module is connected to the $h^{th}$ output terminal and the $(d+h)^{th}$ output terminal of the interconnection module, wherein, d=3, 4, . . . , d−2, the $(d−1)^{th}$ input terminal of the interconnection module is connected to the $d^{th}$ output terminal and the $(2×d)^{th}$ output terminal of the interconnection module, and the $d^{th}$ input terminal of the interconnection module is connected to the $(d−1)^{th}$ output terminal and the $(2×d−1)^{th}$ output terminal of the interconnection module.

In this embodiment, the d input terminals and the 2×d output terminals of the interconnection module are connected correspondingly, and d input signals are duplicated into 2×d output signals to obfuscate transmission paths of the d input signals, such that the unpredictability of signal transmission is improved, thus improving the anti-ML attack capacity.

Figure 5:
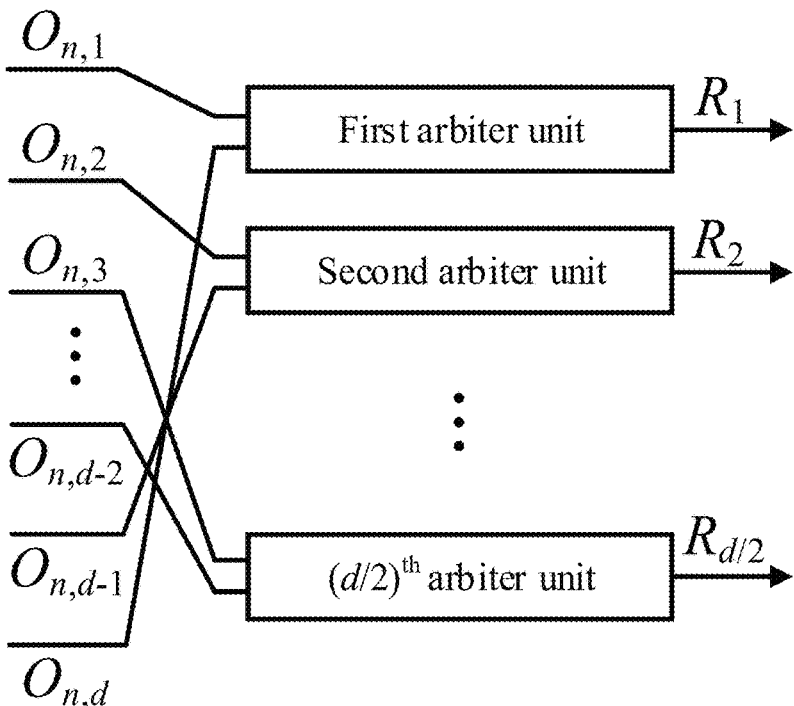
FIG. 5 is a structural diagram of an arbiter array of the strong PUF circuit with good stability and anti-ML attack capacity according to the invention.

Embodiment 4: This embodiment is basically the same as Embodiment 1 but is different from Embodiment 1 in the following aspect: as shown in FIG. 5, in this embodiment, the arbiter array comprises d/2 arbiter units, each arbiter unit has two input terminals and an output terminal, an input signal is input to each input terminal of each arbiter unit, and each arbiter unit arbitrates the two input signals input to the two input terminals thereof to obtain an arbitration result, which is output by means of the output terminal of the arbiter unit as an output signal; and the two input terminals of the d/2 arbiter units, d input terminals in total, are the d input terminals of the arbiter array, and the output terminals of the d/2 arbiter units, d/2 output terminals in total, are the d/2 output terminals of the arbiter array.

Figure 6:
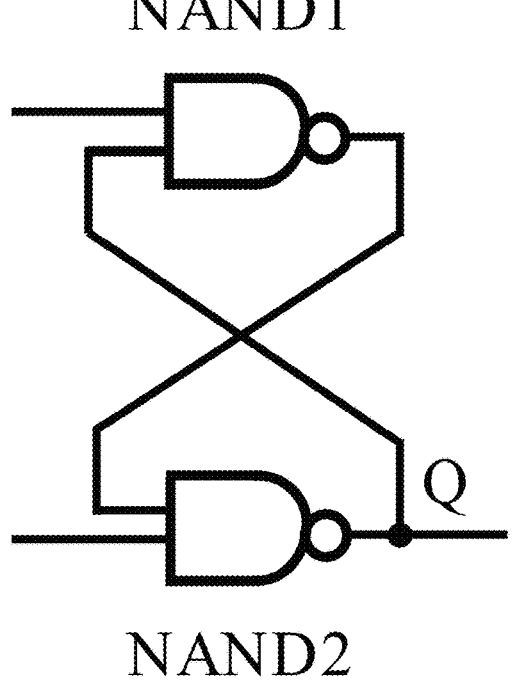
FIG. 6 is a structural diagram of an arbiter unit of the strong PUF circuit with good stability and anti-ML attack capacity according to the invention.

As shown in FIG. 6, in this embodiment, each arbiter unit comprises two input NAND gates, wherein each input NAND gate has a first input terminal, a second input terminal and an output terminal, the two input NAND gates are referred to a first input NAND gate NAND1 and a second input NAND gate NAND2 respectively, the first input terminal of the first input NAND gate NAND1 and the second input terminal of the second input NAND gate NAND2 are the two input terminals of the arbiter unit, the second input terminal of the first input NAND gate NAND1 is connected to the output terminal of the second input NAND gate NAND2 and a connecting terminal is the output terminal of the arbiter unit, and the output terminal of the first input NAND gate NAND1 is connected to the first input terminal of the second input NAND gate NAND2.

In this embodiment, the arbiter unit arbitrates two input signals to output an output signal, and the arbiter array combines and arbitrates every two input signals on symmetrical paths by means of multiple arbiter units to output signals, such that the number of input signals of the XOR gate is reduced, thus improving the stability of the strong PUF circuit with good stability and anti-ML attack capacity provided by the invention.

To verify the performance of the strong PUF circuit with good stability and anti-ML attack capacity provided by the invention, the strong PUF circuit with good stability and anti-ML attack capacity provided by the invention is tested.

Figure 7:
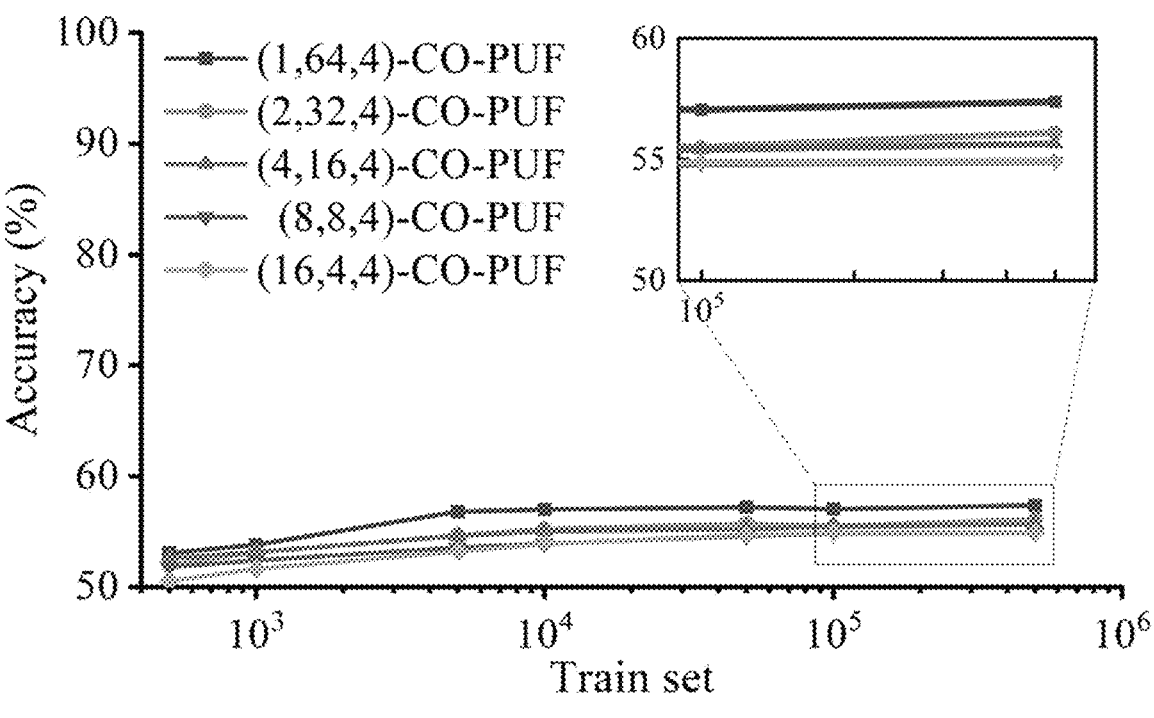
FIG. 7 is a chart of the prediction accuracy of the strong PUF circuit with good stability and anti-ML attack capacity under an LR attack according to the invention.

An ML attack test is performed on the strong PUF circuit with good stability and anti-ML attack capacity provided by the invention using logic regression (LR), 600,000 challenge-response pairs are acquired in total, a train set comprises 500, 1,000, 5,000, 10,000, 50,000, 100,000 and 500,000 challenge-response pairs respectively, a test set comprises 100,000 challenge-response pairs, and the prediction accuracy is shown in FIG. 7. In FIG. 7, the anti-attack capacity of the strong PUF circuit with good stability and anti-ML attack capacity provided by the invention is tested respectively in a case where n=1, l=64 and d=4 (that is, (1,64,4)-CO-PUF), in a case where n=2, l=32 and d=4 (that is, (2,32,4)-CO-PUF), in a case where n=4, l=16 and d=4 (that is, (4,16,4)-CO-PUF), in a case where n=8, l=8 and d=4 (that is, (8,8,4)-CO-PUF), and in a case where n=16, l=4 and d=4 (that is, (16,4,4)-CO-PUF). It can be known by analyzing FIG. 7 that the prediction accuracy of the strong PUF circuit with good stability and anti-ML attack capacity provided by the invention under an LR attack is lower than 59%, indicating that the strong PUF circuit has a good anti-LR attack capacity.

Figure 8:
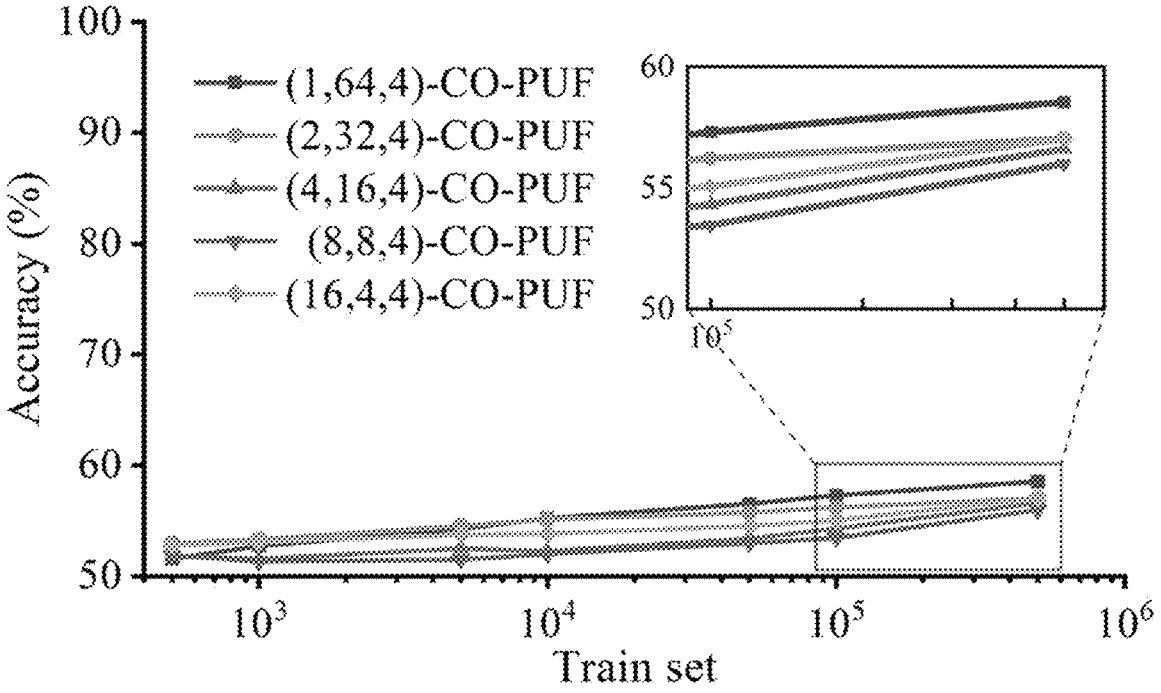
FIG. 8 is a chart of the prediction accuracy of the strong PUF circuit with good stability and anti-ML attack capacity under an SVM attack according to the invention.

An ML attack test is performed on the strong PUF circuit with good stability and anti-ML attack capacity provided by the invention using a support vector machine (SVM), 600,000 challenge-response pairs are acquired in total, a train set comprises 500, 1,000, 5,000, 10,000, 50,000, 100,000 and 500,000 challenge-response pairs respectively, a test set comprises 100,000 challenge-response pairs, and the prediction accuracy is shown in FIG. 8. In FIG. 8, the anti-attack capacity of the strong PUF circuit with good stability and anti-ML attack capacity provided by the invention is tested respectively in a case where n=1, l=64 and d=4 (that is, (1,64,4)-CO-PUF), in a case where n=2, l=32 and d=4 (that is, (2,32,4)-CO-PUF), in a case where n=4, l=16 and d=4 (that is, (4,16,4)-CO-PUF), in a case where n=8, l=8 and d=4 (that is, (8,8,4)-CO-PUF), and in a case where n=16, l=4 and d=4 (that is, (16,4,4)-CO-PUF). It can be known by analyzing FIG. 8 that the prediction accuracy of the strong PUF circuit with good stability and anti-ML attack capacity provided by the invention under an SVM attack is lower than 59%, indicating that the strong PUF circuit has a good anti-SVM attack capacity.

Figure 9:
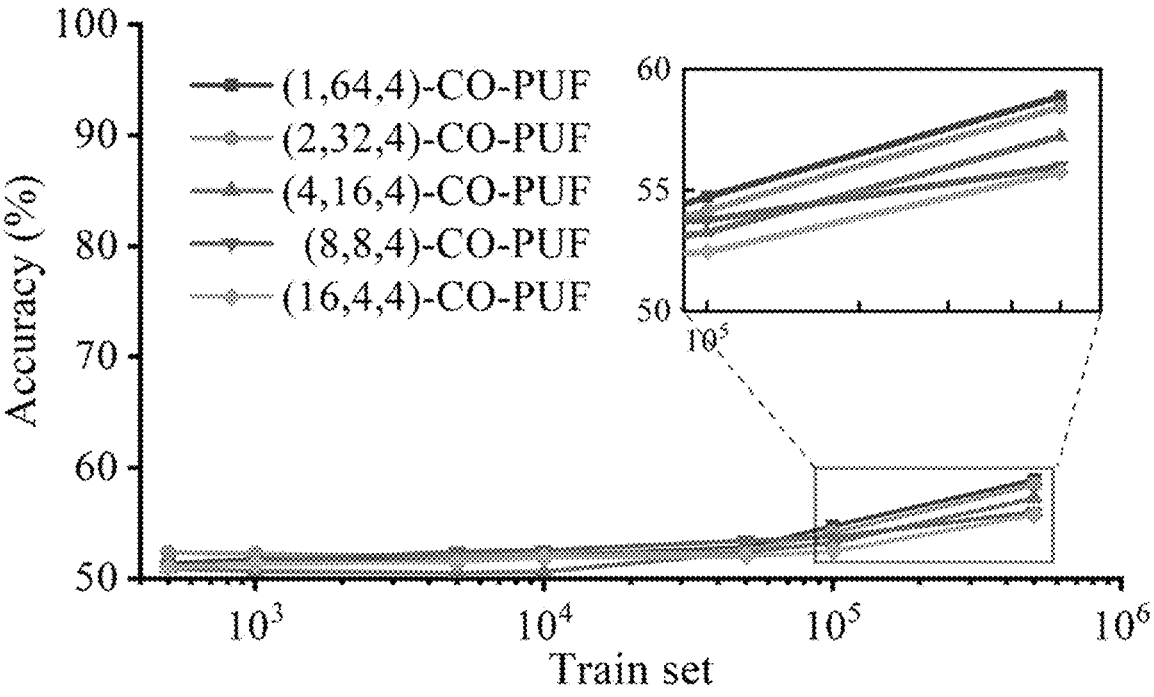
FIG. 9 is a chart of the prediction accuracy of the strong PUF circuit with good stability and anti-ML attack capacity under an ANN attack according to the invention.

An ML attack test is performed on the strong PUF circuit with good stability and anti-ML attack capacity provided by the invention using an artificial neural network (ANN), 600,000 challenge-response pairs are acquired in total, a train set comprises 500, 1,000, 5,000, 10,000, 50,000, 100,000 and 500,000 challenge-response pairs respectively, a test set comprises 100,000 challenge-response pairs, and the prediction accuracy is shown in FIG. 9. In FIG. 9, the anti-attack capacity of the strong PUF circuit with good stability and anti-ML attack capacity provided by the invention is tested respectively in a case where n=1, l=64 and d=4 (that is, (1,64,4)-CO-PUF), in a case where n=2, l=32 and d=4 (that is, (2,32,4)-CO-PUF), in a case where n=4, l=16 and d=4 (that is, (4,16,4)-CO-PUF), in a case where n=8, l=8 and d=4 (that is, (8,8,4)-CO-PUF), and in a case where n=16, l=4 and d=4 (that is, (16,4,4)-CO-PUF). It can be known by analyzing FIG. 9 that the prediction accuracy of the strong PUF circuit with good stability and anti-ML attack capacity provided by the invention under an ANN attack is lower than 59%, indicating that the strong PUF circuit has a good anti-ANN attack capacity.

Figure 10:
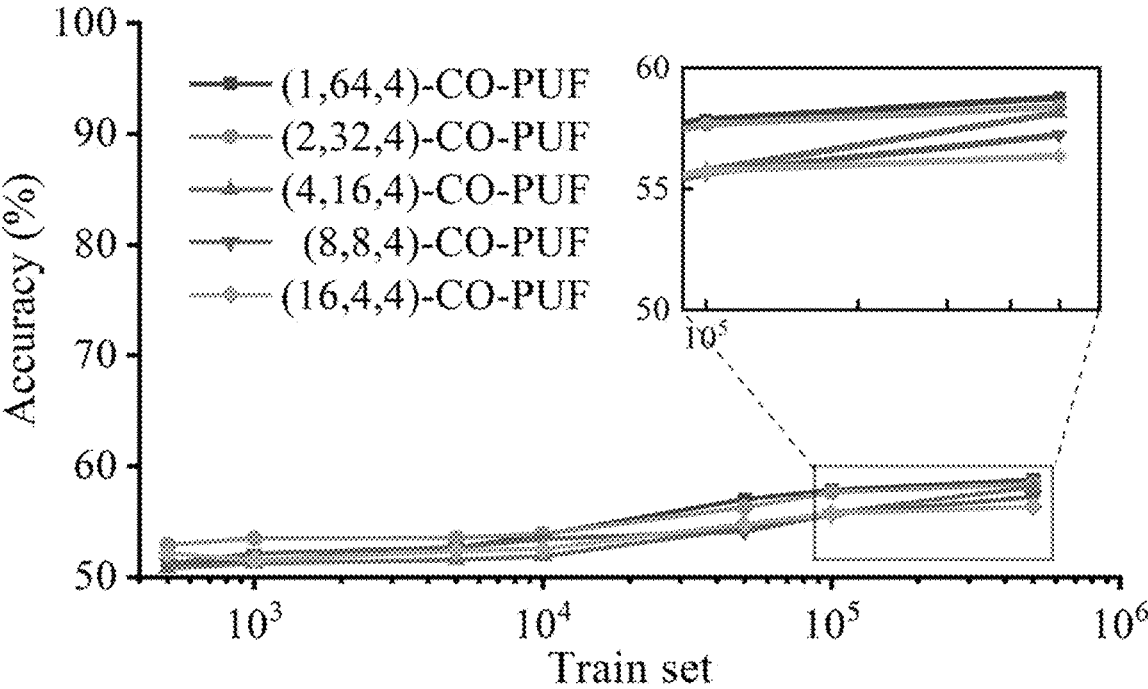
FIG. 10 is a chart of the prediction accuracy of the strong PUF circuit with good stability and anti-ML attack capacity in case of a light GBM attack according to the invention.

An ML attack test is performed on the strong PUF circuit with good stability and anti-ML attack capacity provided by the invention using a light gradient boosting machine (light GBM), 600,000 challenge-response pairs are acquired in total, a train set comprises 500, 1,000, 5,000, 10,000, 50,000, 100,000 and 500,000 challenge-response pairs respectively, a test set comprises 100,000 challenge-response pairs, and the prediction accuracy is shown in FIG. 10. In FIG. 10, the anti-attack capacity of the strong PUF circuit with good stability and anti-ML attack capacity provided by the invention is tested respectively in a case where n=1, l=64 and d=4 (that is, (1,64,4)-CO-PUF), in a case where n=2, l=32 and d=4 (that is, (2,32,4)-CO-PUF), in a case where n=4, l=16 and d=4 (that is, (4,16,4)-CO-PUF), in a case where n=8, l=8 and d=4 (that is, (8,8,4)-CO-PUF), and in a case where n=16, l=4 and d=4 (that is, (16,4,4)-CO-PUF). It can be known by analyzing FIG. 10 that the prediction accuracy of the strong PUF circuit with good stability and anti-ML attack capacity provided by the invention under a light GBM attack is lower than 59%, indicating that the strong PUF circuit has a good anti-light GBM attack capacity.

Figure 11:
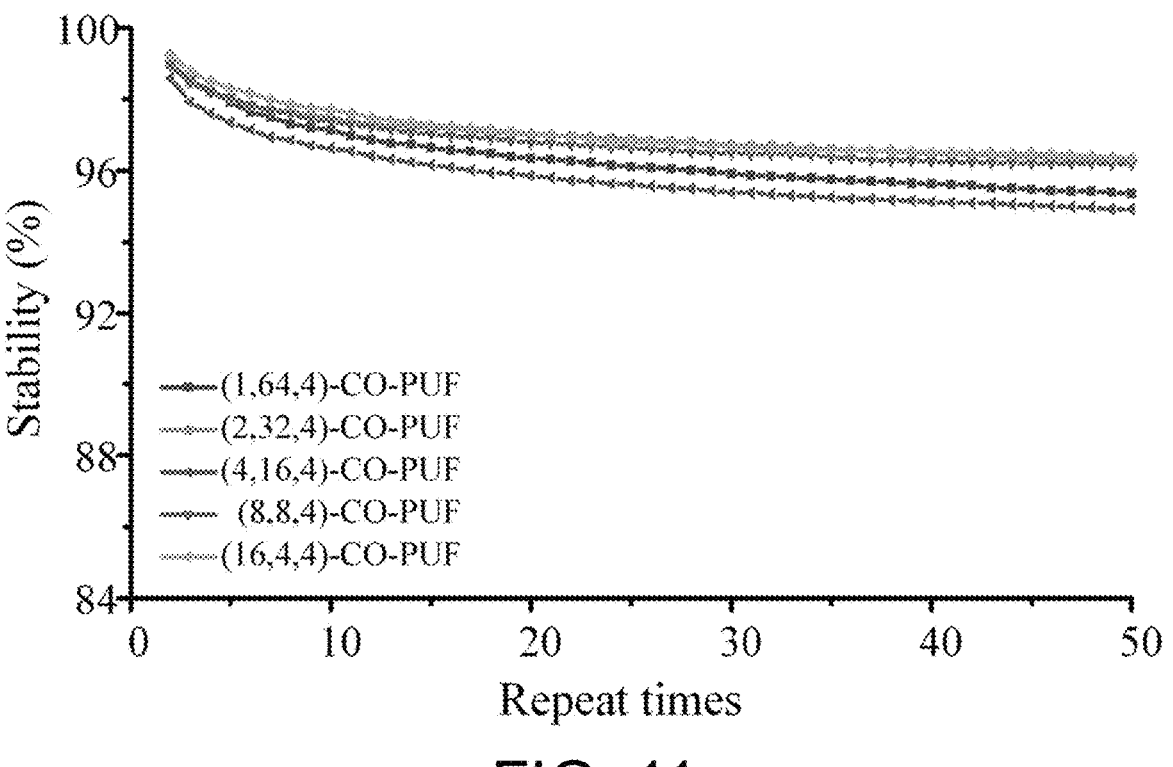
FIG. 11 is a chart of the relation between the repeat times of a test and the stability of the strong PUF circuit with good stability and anti-ML attack capacity according to the invention.

The stability of the strong PUF circuit with good stability and anti-ML attack capacity provided by the invention is tested under the same FPGA and room temperature, 10,000 groups of identical challenges are used for a test repeatedly, and every time the test is repeated, the stability of the strong PUF circuit is calculated. The relation between the repeat times of the test and the stability of the strong PUF circuit with good stability and anti-ML attack capacity provided by the invention is shown in FIG. 11. In FIG. 11, the stability of the strong PUF circuit with good stability and anti-ML attack capacity provided by the invention in a case where n=1, l=64 and d=4 (that is, (1,64,4)-CO-PUF), in a case where n=2, l=32 and d=4 (that is, (2,32,4)-CO-PUF), in a case where n=4, l=16 and d=4 (that is, (4,16,4)-CO-PUF), in a case where n=8, l=8 and d=4 (that is, (8,8,4)-CO-PUF), and in a case where n=16, l=4 and d=4 (that is, (16,4,4)-CO-PUF) is tested. It can be seen from FIG. 11 that after the test is repeated 50 times, the stability of the strong PUF circuit with good stability and anti-ML attack capacity provided by the invention is over 95%, indicating that the strong PUF circuit has good stability.

Figure 12:
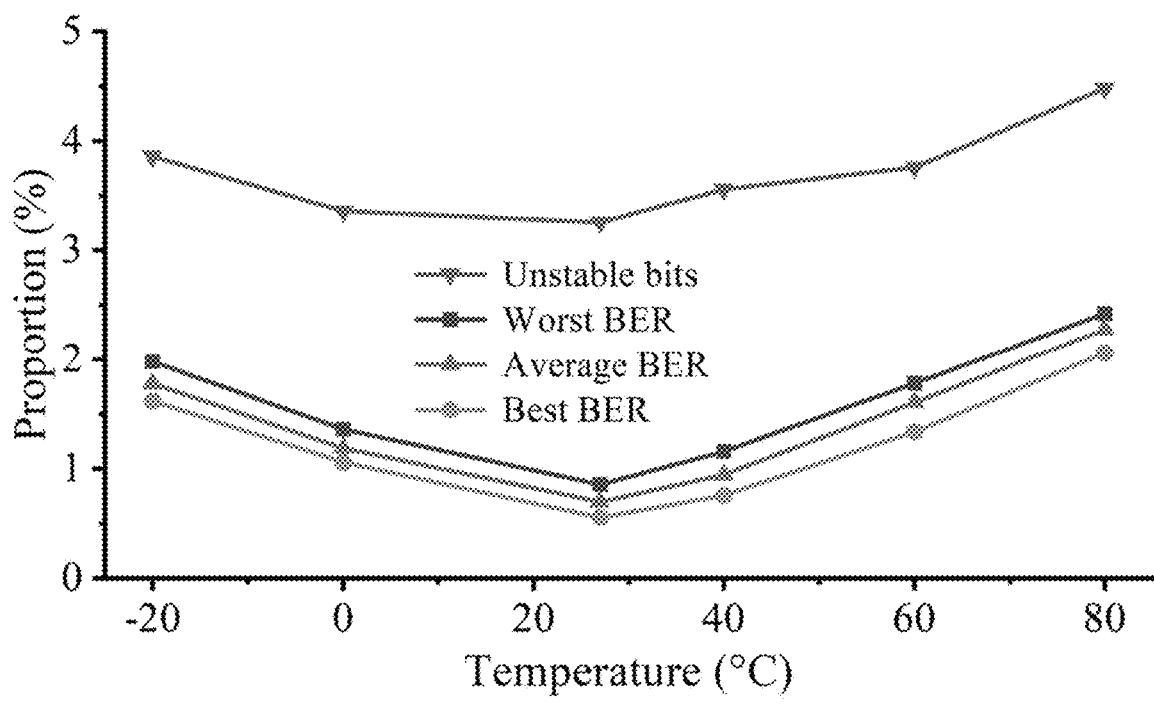
FIG. 12 illustrates the bit error rate and the proportion of unstable bits of the strong PUF circuit with good stability and anti-ML attack capacity at different temperatures in a case where n=1, l=64 and d=4 according to the invention.

The bit error rate and the proportion of unstable bits of the strong PUF circuit with good stability and anti-ML attack capacity provided by the invention in a case where n=1, l=64 and d=4 are tested at different temperatures. The strong PUF circuit is placed in an incubator at a temperature ranging from −20° C. to 80° C., 1,000 groups of responses are extracted under the same challenge in each test, and the test is repeated 21 times. 21 responses at the temperature of 27° C. are selected by majority voting as reference responses, 21 responses obtained at other temperatures are compared with the reference responses to obtain the bit error rate at this temperature in each test, and a maximum bit error rate, a minimum bit error rate and an average bit error rate of the 21 responses are recorded. The bit error rate and proportion of unstable bits of the strong PUF circuit with good stability and anti-ML attack capacity provided by the invention at different temperatures are shown in FIG. 12. It can be seen from FIG. 12 that the average bit error rate of the strong PUF circuit with good stability and anti-ML attack capacity provided by the invention at −20° C. is 1.54%, the average bit error rate of the strong PUF circuit at 80° C. is 2.68%, and the proportion of unstable bits at 0° C. is the lowest.

Figure 13:
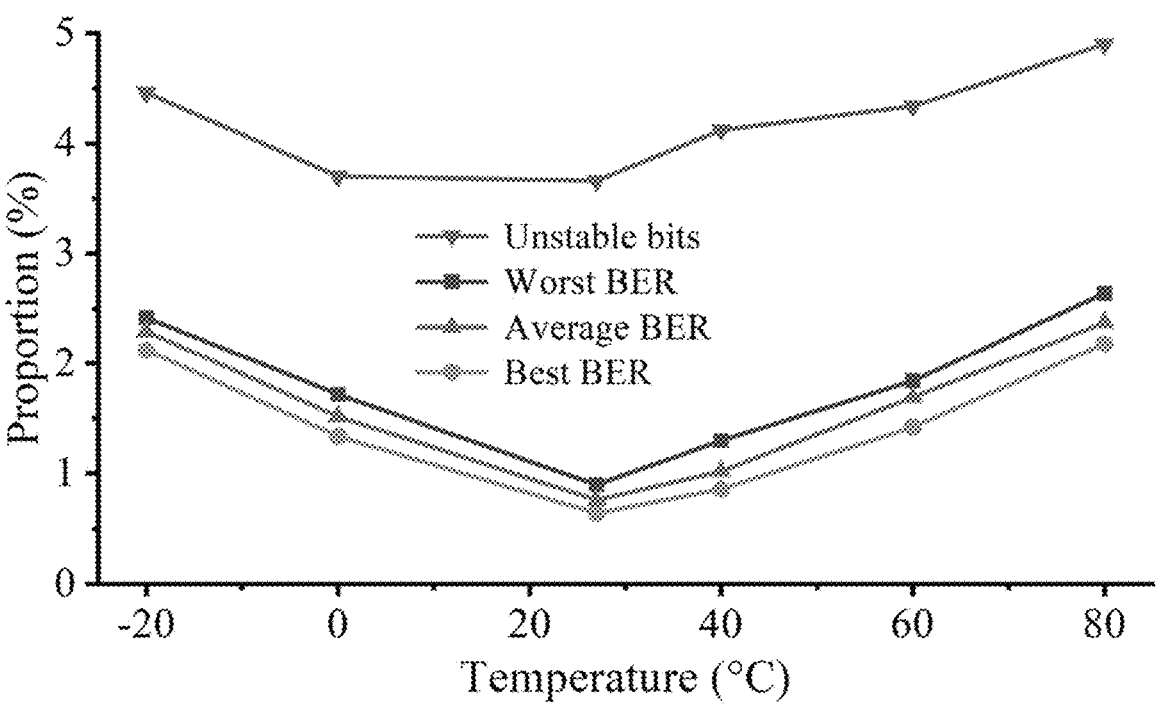
FIG. 13 illustrates the bit error rate and the proportion of unstable bits of the strong PUF circuit with good stability and anti-ML attack capacity at different temperatures in a case where n=16, l=4 and d=4 according to the invention.

The bit error rate and the proportion of unstable bits of the strong PUF circuit with good stability and anti-ML attack capacity provided by the invention in a case where n=16, l=64 and d=4 are tested at different temperatures. The strong PUF circuit is placed in an incubator at a temperature ranging from −20° C. to 80° C., 1,000 groups of responses are extracted under the same challenge in each test, and the test is repeated 21 times. 21 responses at the temperature of 27° C. are selected by majority voting as reference responses, 21 responses obtained at other temperatures are compared with the reference responses to obtain the bit error rate at this temperature in each test, and a maximum bit error rate, a minimum bit error rate and an average bit error rate of the 21 responses are recorded. The bit error rate and proportion of unstable bits of the strong PUF circuit with good stability and anti-ML attack capacity provided by the invention at different temperatures are shown in FIG. 13. It can be seen from FIG. 13 that the average bit error rate of the strong PUF circuit with good stability and anti-ML attack capacity provided by the invention at −20° C. is 1.94%, the average bit error rate of the strong PUF circuit at 80° C. is 2.63%, and the proportion of unstable bits at 0° C. is the lowest.

Figure 14:
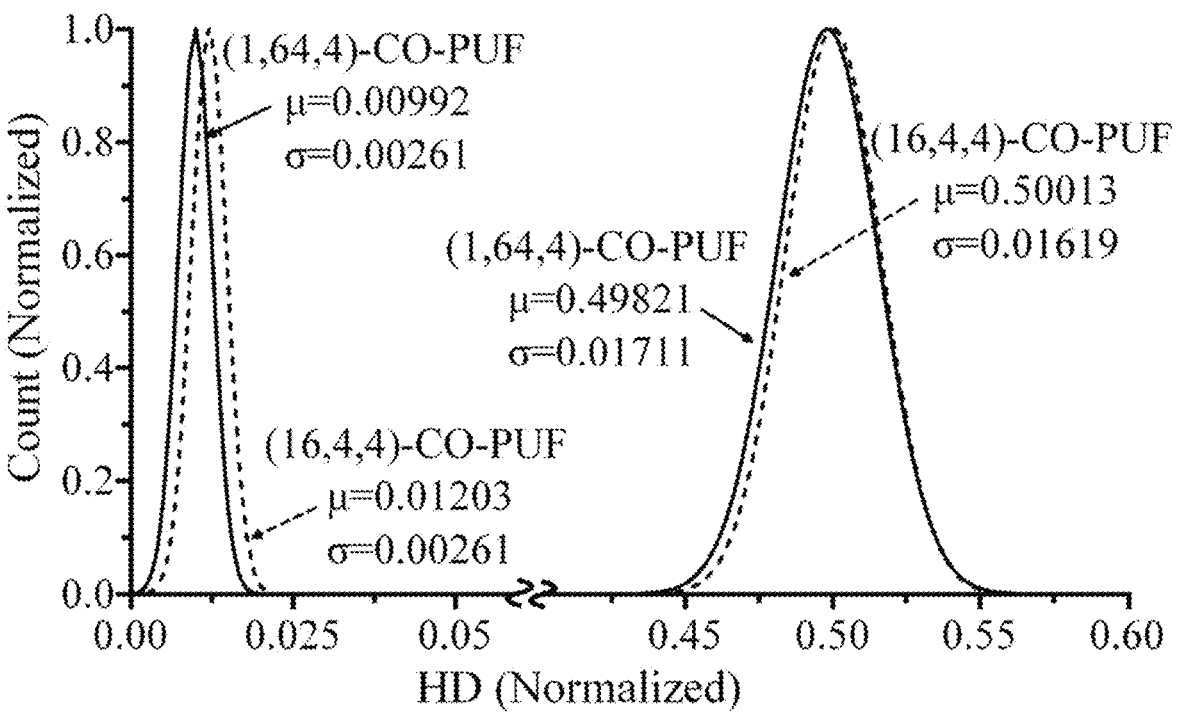
FIG. 14 is a chart of the inter-Hamming distance and the intra-Hamming distance of the strong PUF circuit with good stability and anti-ML attack capacity according to the invention.

The uniqueness describes the capacity of a PUF example to distinguish itself from other PUF examples. The strong PUF circuit with good stability and anti-ML attack capacity provided by the invention is placed in a normal-temperature and normal-pressure environment to cyclically read output responses. The inter-Hamming distance and intra-Hamming distance of the strong PUF circuit with good stability and anti-ML attack capacity provided by the invention obtained by testing are shown in FIG. 14. In FIG. 14, the inter-Hamming distance and intra-Hamming distance of the strong PUF circuit with good stability and anti-ML attack capacity provided by the invention in a case where n=1, l=64 and d=4 (that is, (1,64,4)-CO-PUF) and in a case where n=16, l=4 and d=4 (that is, (16,4,4)-CO-PUF) are tested. It can be known by analyzing FIG. 14 that the inter-Hamming distance and intra-Hamming distance of the strong PUF circuit with good stability and anti-ML attack capacity provided by the invention in a case where n=1, l=64 and d=4 are 49.821% and 0.00992 respectively, which are close to desired values 50% and 0, indicating that the strong PUF circuit has good uniqueness. The inter-Hamming distance and intra-Hamming distance of the strong PUF circuit with good stability and anti-ML attack capacity provided by the invention in a case where n=16, l=4 and d=4 are 50.013% and 0.01203 respectively, which are close to desired values 50% and 0, indicating that the strong PUF circuit has good uniqueness.

What is claimed is:

1. A strong PUF circuit with good stability and anti-ML attack capacity, comprising:
   n delay modules, n−1 interconnection modules, an arbiter array, and an XOR gate, wherein n is an integer greater than or equal to 1, each of the n delay modules is implemented based on a bias source structure, and each of the n delay modules has 2×d input terminals, 1 selection terminals and d output terminals, wherein $d=2^i$, and i is an integer greater than or equal to 2, l is an integer greater than or equal to 1, wherein each of the n−1 interconnection modules has d input terminals and 2×d output terminals, the arbiter array has d input terminals and d/2 output terminals, and the XOR gate has d/2 input terminals and an output terminal;

wherein when n=1, the d output terminals of the $n^{th}$ delay module are connected to the d input terminals of the arbiter array in one-to-one correspondence;

wherein when n=2, the d output terminals of the first delay module are connected to the d input terminals of the first interconnection module in one-to-one correspondence, the 2×d output terminals of the first interconnection module are connected to the 2×d input terminals of the second delay module in one-to-one correspondence, and the d output terminals of the $n^{th}$ delay module are connected to the d input terminals of the arbiter array in one-to-one correspondence;

wherein when n is greater than or equal to 3, the d output terminals of the $p^{th}$ delay module are connected to the d input terminals of the $p^{th}$ interconnection module in one-to-one correspondence, the 2×d output terminals of the $p^{th}$ interconnection module are connected to the 2×d input terminals of the $(p+1)^{th}$ delay module in one-to-one correspondence, wherein p=1, 2, . . . , n−1, and the d output terminals of the $n^{th}$ delay module are connected to the d input terminals of the arbiter array in one-to-one correspondence;

wherein the d/2 output terminals of the arbiter array are connected to the d/2 input terminals of the XOR gate in one-to-one correspondence;

wherein the l selection terminals of the n delay modules form n×l challenge terminals of the strong PUF circuit with an anti-ML attack capacity and allow n×l challenge signals to be input thereto, the output terminal of the XOR gate is an output terminal of the strong PUF circuit with an anti-ML attack capacity and used for outputting PUF responses, and the 2×d input terminals of the first delay module are 2×d trigger terminals of the strong PUF circuit with an anti-ML attack capacity and allow 2×d input signals to be input thereto as trigger signals;

wherein l challenge signals are input to the l selection terminals of each delay module, 2×d input signals are input to the 2×d input terminals of each delay module, and each delay module from the first delay module to the $(n−1)^{th}$ delay module combines every two of the 2×d input signals input to the 2×d input terminals thereof under the control of the l challenge signals input to the l selection terminals thereof to form d groups of input signals to be screened, wherein the input signal with a large delay is screened out of each of the d/2 groups, the input signal with a small delay is screened out of each of the other d/2 groups, d output signals are generated according to the d/2 input signals with a large delay and the d/2 input signals with a small delay and used as d input signals of the interconnection module connected to the delay module;

wherein the $n^{th}$ delay module combines every two of the 2×d input signals input to the 2×d input terminals thereof under the control of the l challenge signals input to the l selection terminals thereof to form d groups of input signals, wherein the input signal with a large delay is screened out of each of the d/2 groups, the input signal with a small delay is screened out of each of the other d/2 groups, and d output signals are generated according to the d/2 input signals with a large delay and the d/2 input signals with a small delay, which are used as d input signals of the arbiter array and input to the d input terminals of the arbiter array in one-to-one correspondence by means of the d output terminals of the $n^{th}$ delay module;

wherein the arbiter array combines every two of the d input signals input to the d input terminals thereof to form d/2 groups of input signals for arbitration to obtain d/2 arbitration signals, which are used as d/2 input signals of the XOR gate and input to the d/2 input terminals of the XOR gate in one-to-one correspondence by means of the d/2 output terminals of the arbiter array; the XOR gate performs an XOR operation on the d/2 input signals input to the d/2 input terminals thereof to obtain a PUF response, which is output by means of the output terminal of the XOR gate; and wherein each interconnection module is used for duplicating the d input signals input to the d input terminals thereof to generate 2×d output signals, which are used as 2×d input signals of the delay module connected to the interconnection module and output to the 2×d input terminals of the delay module connected to the interconnection module in one-to-one correspondence by means of the 2×d output terminals of the interconnection module.

2. The strong PUF circuit with the good stability and the anti-ML attack capacity according to claim 1, wherein each of the n delay modules comprises l stages of upper bias sources, l stages of lower bias sources, d/2 AND gates and d/2 OR gates, wherein each stage of upper bias source and each stage of lower bias source respectively have d input terminals, d output terminals and a selection terminal, wherein each of the d/2 AND gates has two input terminals and an output terminal, and each of the d/2 OR gates has two input terminals and an output terminal;

wherein a challenge signal is input to the selection terminal of each stage of upper bias source, d input signals are input to the d input terminals of each stage of upper bias source, and each stage of upper bias source transforms transmission paths of the d input signals input to the d input terminals thereof under control of the challenge signal input to the selection terminal thereof to generate d output signals, which are output by means of the d output terminals of said stage of upper bias source in one-to-one correspondence;

wherein a challenge signal is input to the selection terminal of each stage of lower bias source, d input signals are input to the d input terminals of each stage of lower bias source, and each stage of lower bias source transforms transmission paths of the d input signals input to the d input terminals thereof under the control of the challenge signal input to the selection terminal thereof to generate d output signals, which are output by means of the d output terminals of said stage of lower bias source in one-to-one correspondence;

wherein the d input terminals of a first stage of upper bias source and the d input terminals of the first stage of lower bias source, are used as the 2×d input terminals of the delay module;

wherein the output terminals of the d/2 AND gates and the output terminals of the d/2 OR gate are used as the d output terminals of the delay module;

wherein the selection terminal of the $1^{th}$ stage of upper bias source is connected to the selection terminal of the $1^{th}$ stage of lower bias source and a connecting terminal is the $1^{th}$ selection terminal of the delay module, and the first to the $1^{th}$ selection terminals of the delay module form the l selection terminals of the delay module;

wherein when l=1, the d output terminals of the first stage of upper bias source are connected to the first input terminals of the d/2 AND gate and the first input terminals the d/2 OR gates, d input terminals in total, in one-to-one correspondence, the d output terminals of the first stage of lower bias source are connected to the second input terminals of the d/2 AND gate and the second input terminals of the d/2 OR gates, d input terminals in total, in one-to-one correspondence, d output signals generated by the first stage of upper bias source and d output signals generated by the first stage of lower bias source are combined in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on the two input signals input to the two input terminals thereof to obtain an operation result, which is output by means of the output terminal of the OR gate as an output signal;

wherein when l=2, the d output terminals of the first stage of upper bias source are connected to the d input terminals of the second stage of upper bias source in one-to-one correspondence, the d output terminals of the second stage upper bias source are connected to the first input terminals of the d/2 AND gates and the first input terminals of the d/2 OR gates, d input terminals in total, in one-to-one correspondence, the d output terminals of the first stage of lower bias source are connected to the d input terminals of the second stage of lower bias source in one-to-one correspondence, the d output terminals of the second stage of lower bias source are connected to the first input terminals of the d/2 AND gates and the first input terminals of the d/2 OR gates, d input terminals in total, in one-to-one correspondence, d output signals generated by the first stage of upper bias source are used as d input signals input to the d input terminals of the second stage of upper bias source, d output signals generated by the first stage of lower bias source are used as d input signals input to the d input terminals of the second stage of lower bias source, d output signals generated by the second stage of upper bias source are combined with d output signals generated by the second stage of lower bias sources in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on two input signals input to the two input terminals thereof to obtain an operation result, which is output by means of the output terminal of the OR gate as an output signal;

wherein when l≥3, the d output terminals of the $q^{th}$ stage of upper bias source are connected to the d input terminals of the $(q+1)^{th}$ stage of upper bias source in one-to-one correspondence, wherein q=1, 2, . . . , l−1, the d output terminals of the $1^{th}$ stage of upper bias source are connected to the first input terminals of the d/2 AND gates and the first input terminals of the d/2 OR gate, d input terminals in total, in one-to-one correspondence, the d output terminals of an $s^{th}$ stage of lower bias source are connected to the d input terminals of the $(s+1)^{th}$ stage of lower bias source in one-to-one correspondence, wherein s=1, 2, . . . , l−1, and the d output terminals of the $1^{th}$ stage of lower bias source are connected to the second input terminals of the d/2 AND gates and the second input terminals of the d/2 OR gate, d input terminals, in one-to-one correspondence;

wherein, d output signals generated by the $q^{th}$ stage of upper bias source are used as d input signals input to the d input terminals of the $(q+1)^{th}$ stage of upper bias source; d output signals generated by the $q^{th}$ stage of lower bias source are used as d input signals input to the d input terminals of the $(q+1)^{th}$ stage of lower bias source;

wherein d output signals generated by the $1^{th}$ stage of upper bias source are combined with d output signals generated by the $1^{th}$ stage of lower bias source in one-to-one correspondence to form d groups of input signals, which are output to the two input terminals of the d/2 AND gates and the two input terminals of the d/2 OR gates in one-to-one correspondence, each of the d/2 AND gates performs an AND operation on two input signals input to the two input terminals thereof to obtain an operation result, which is output by means of the output terminal of the AND gate as an output signal, and each of the d/2 OR gates performs an OR operation on two input signals input to the two input terminals thereof to obtain an operation result, which is output by means of the output terminal of the OR gate as an output signal.

3. The strong PUF circuit with the good stability and the anti-ML attack capacity according to claim 2, wherein each of the upper bias sources comprises d multiplexers; each of the d multiplexers has two data input terminals, a selection terminal and an output terminal, wherein the two data input terminals are referred to as a first input terminal and a second input terminals respectively;

wherein when 0 is input to the selection terminal, the first input terminal is connected to the output terminal;

wherein when 1 is input to the selection terminal, the second input terminal is connected to the output terminal;

the selection terminals of the d multiplexers are connected to form a connecting terminal which is the selection terminal of the upper bias source;

the output terminals of the d multiplexers are used as the d output terminals of the upper bias source;

wherein when d=4, the first input terminal of the first multiplexer is connected to the second input terminal of the second multiplexer to form a connecting terminal which is the first input terminal of the upper bias source, the second input terminal of the first multiplexer is connected to the first input terminal of the third multiplexer to form a connecting terminal which is the second input terminal of the upper bias source, the first input terminal of the second multiplexer is connected to the second input terminal of the fourth multiplexer to form a connecting terminal which is the third input terminal of the upper bias source, and the second input terminal of the third multiplexer is connected to the first input terminal of the fourth multiplexer to form a connecting terminal which is the fourth input terminal of the upper bias source;

wherein when d is greater than 4, the first input terminal of the first multiplexer is connected to the second input terminals of the second multiplexer to form a connecting terminal which is the first input terminal of the upper bias source;

the first input terminal of the $m^{th}$ multiplexer is connected to the second input terminal of the $(m-2)^{th}$ multiplexer to form a connecting terminal which is the $(m-1)^{th}$ input terminal of the upper bias source, wherein m is an odd number, and m=3, 5, 7, . . . , d−1;

the first input terminal of the $w^{th}$ multiplexer is connected to the second input terminal of the $(w+2)^{th}$ multiplexer to form a connecting terminal which is the $(w+1)^{th}$ input terminal of the upper bias source, wherein w is an even number, and w=2, 4, 6, . . . , d−2;

the first input terminal of the $d^{th}$ multiplexer is connected to the second input terminal of the $(d-1)^{th}$ multiplexer to form a connecting terminal which is the $d^{th}$ input terminal of the upper bias source; and the structure of each lower bias source is the completely identical with the structure of each upper bias source.

4. The strong PUF circuit with the good stability and the anti-ML attack capacity according to claim 1, wherein when d=4, the first input terminal of the interconnection module is connected to the second output terminal and the sixth output terminal of the interconnection module, the second input terminal of the interconnection module is connected to the first output terminal and the fifth output terminal of the interconnection module, the third input terminal of the interconnection module is connected to the third output terminal and the seventh output terminal of the interconnection module, and the output input terminal of the interconnection module is connected to the fourth output terminal and the eighth output terminal of the interconnection module;

wherein when d is greater than 4, the first input terminal of the interconnection module is connected to the second output terminal and the $(d+2)^{th}$ output terminal of the interconnection module, the second input terminal of the interconnection module is connected to the first output terminal and the $(d+1)^{th}$ output terminal of the interconnection module, the $h^{th}$ input terminal of the interconnection module is connected to the $h^{th}$ output terminal and the $(d+h)^{th}$ output terminal of the interconnection module, wherein, d=3, 4, . . . , d−2, the $(d-1)^{th}$ input terminal of the interconnection module is connected to the $d^{th}$ output terminal and the $(2×d)^{th}$ output terminal of the interconnection module, and the $d^{th}$ input terminal of the interconnection module is connected to the $(d-1)^{th}$ output terminal and the $(2×d-1)^{th}$ output terminal of the interconnection module.

5. The strong PUF circuit with the good stability and the anti-ML attack capacity according to claim 1, wherein the arbiter array comprises d/2 arbiter units, each of the arbiter unit has two input terminals and an output terminal, wherein an input signal is input to each input terminal of each arbiter unit, and each of the arbiter units arbitrates the two input signals input to the two input terminals thereof to obtain an arbitration result, which is output by means of the output terminal of the arbiter unit as an output signal; and wherein the two input terminals of the d/2 arbiter units are the d input terminals of the arbiter array, and the output terminals of the d/2 arbiter units are the d/2 output terminals of the arbiter array.

6. The strong PUF circuit with the good stability and the anti-ML attack capacity according to claim 5, wherein each arbiter unit comprises two input NAND gates, wherein each input NAND gate has a first input terminal, a second input terminal, and an output terminal, wherein the two input NAND gates serves as a first input NAND gate and a second input NAND gate, respectively;

wherein the first input terminal of the first input NAND gate and the second input terminal of the second input NAND gate are the two input terminals of the arbiter unit;

wherein the second input terminal of the first input NAND gate is connected to the output terminal of the second input NAND gate to form a connecting terminal which is the output terminal of the arbiter unit; and wherein the output terminal of the first input NAND gate is connected to the first input terminal of the second input NAND gate.

* * * * *